March 8, 1938.  H. E. HAMILTON  2,110,396
SAW FILING MACHINE
Filed May 2, 1936  2 Sheets-Sheet 1
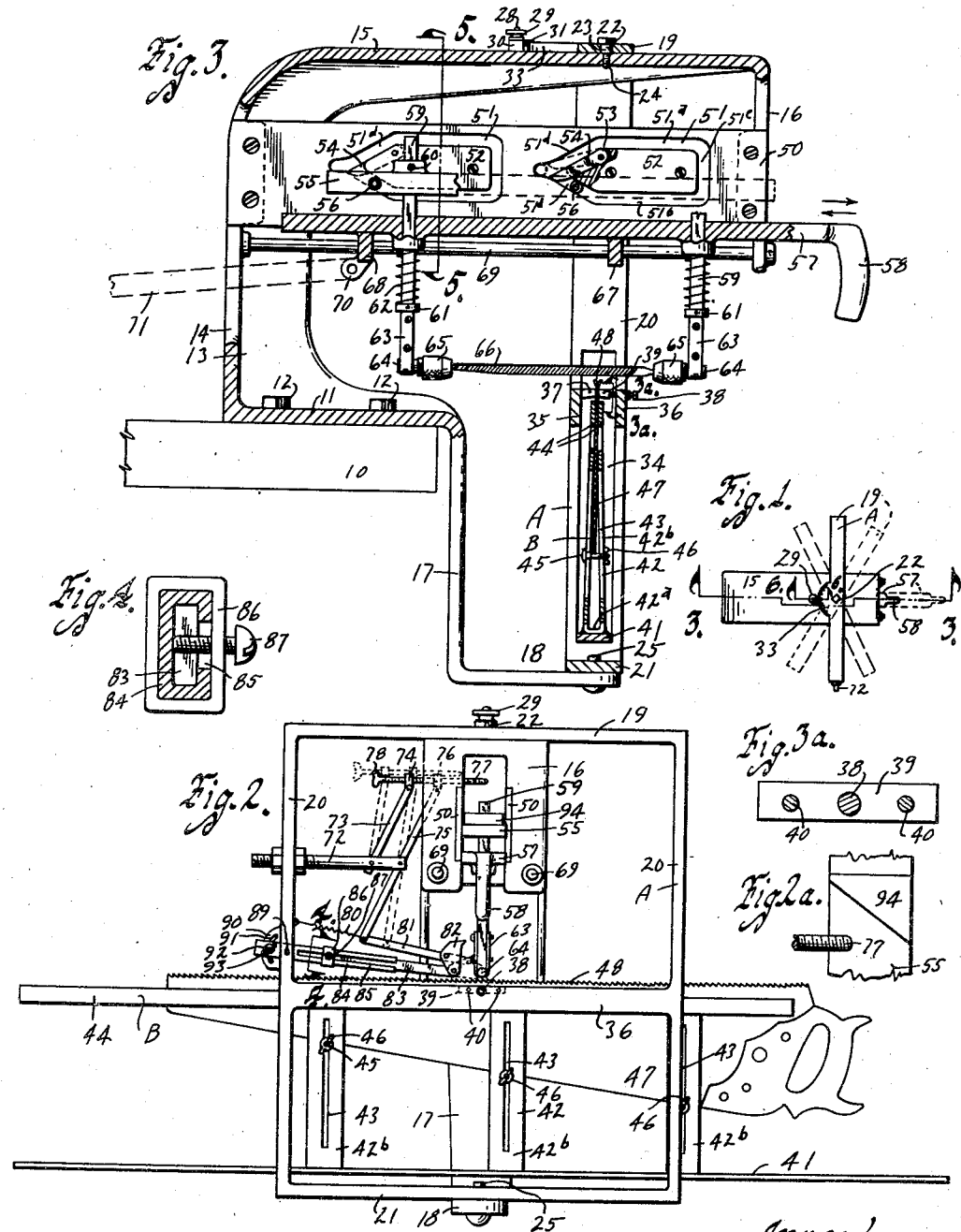
Witness
H. S. Munzenmaier
Inventor
Herbert E. Hamilton
By Bair, Freeman & Sinclair
Attorneys

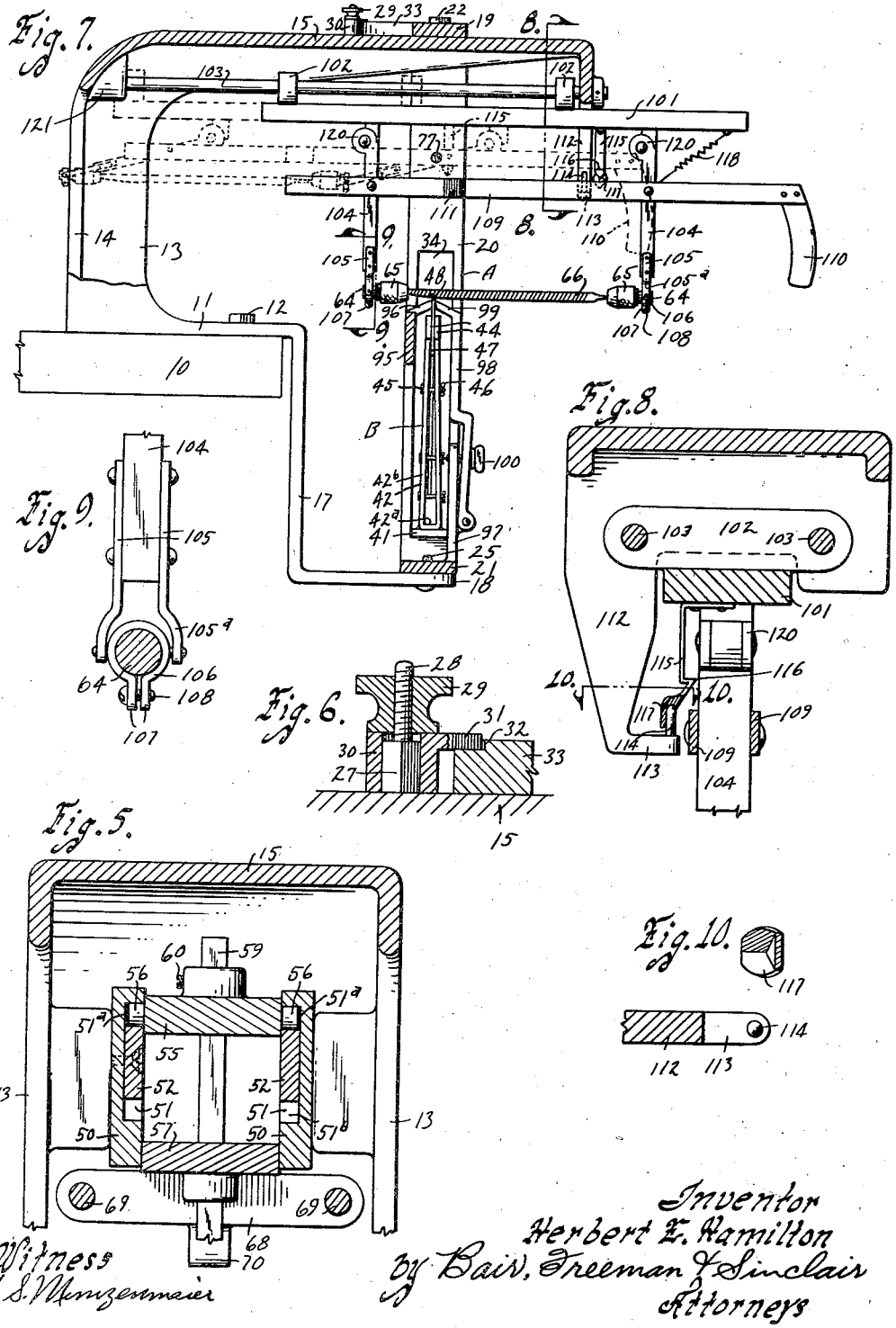

Patented Mar. 8, 1938

2,110,396

UNITED STATES PATENT OFFICE 2,110,396

SAW FILING MACHINE

Herbert E. Hamilton, Conrad, Iowa

Application May 2, 1936, Serial No. 77,495

2 Claims. (Cl. 76—31)

The object of my invention is to provide a saw filing machine of simple construction, by which a saw can be filed by hand rapidly and accurately.

Another object is to provide such a machine which can readily be connected with a source of power for power operation.

Another object is to provide in such a machine saw filing mechanism and means actuated thereby for automatically moving the saw after each filing operation.

Another object is to provide novel mechanism for guiding the file for saw filing operations.

With these and other objects in view, my invention consists in the construction, arrangement and combination of my saw filing machine, whereby the objects contemplated are attained, as hereinafter more fully set forth, pointed out in my claims, and illustrated in the accompanying drawings, in which:

Figure 1 is a top or plan view of a saw filing machine embodying my invention shown in somewhat diagrammatic form.

Figure 2 is a front elevation of the same.

Figure 2a is a top or plan view of the cam which functions in advancing the saw after each filing operation.

Figure 3 is a detail, sectional view taken on the line 3—3 of Figure 1.

Figure 3a is a sectional view taken on the line 3a—3a of Figure 3.

Figure 4 is a detail, sectional view taken on the line 4—4 of Figure 2.

Figure 5 is a detail, sectional view taken on the line 5—5 of Figure 3.

Figure 6 is a sectional view taken on the line 6—6 of Figure 1.

Figure 7 is a view similar to that of Figure 3 illustrating a modified form of file supporting mechanism.

Figure 8 is a detail, sectional view taken on the line 8—8 of Figure 7.

Figure 9 is a detail, sectional view taken on the line 9—9 of Figure 7; and

Figure 10 is a sectional view on the line 10—10 of Figure 8.

In the accompanying drawings, I have used the reference numeral 10 to indicate generally a bench or other support on which my saw filing machine may be mounted.

The machine itself has a base 11, which may be fastened to the support 10 by means of a bolt 12 or otherwise.

From what may be called the rear end of the base 11, there extends upwardly an arm 13 which has a central, vertical opening 14, through which operating parts may project.

At the upper end of the arm 13 is a forwardly extending arm 15, from which the bifurcated arm 16 extends downwardly.

From the forward end of the base 11, the leg 17 hangs downwardly and terminates in the forward extension 18.

A rectangular frame A has the top 19, the sides 20 and the bottom 21. The top 19 overlies the arm 15 and the bottom 21 rests on the extension 18. The top 19 is fastened to the arm 15 by means of a screw 22, having a cylindrical portion 23 journaled in the top 19 and a threaded portion 24 screwed into the arm 15.

The bottom 21 is pivoted or journaled on a stud 25 extending upwardly from the extension 18.

The stud 25 and screw 22 are aligned with each other and the frame A can be swung to different angles as illustrated by the full lines and dotted lines in Figure 1, on a vertical axis extending through the centers of the stud 25 and screw 22.

Any suitable means may be provided for locking the frame A in its adjusted positions.

In Figure 6, I have shown a stud 27 extending upwardly from the arm 15. The stud 27 is angular in cross section and has an upwardly extended threaded member 28 on which is a lock nut 29. Between the lock nut 29 and the arm 15 is a sleeve 30, having an angular bore to receive the stud 27.

Projecting from the sleeve 30 is a locking finger 31, which may be selectively received in any one of a series of notches 32 in the curved lug 33 on the top frame member 19. (See Figures 1, 3 and 6.)

The sides 20 of the frame A have in their lower portions the openings 34. The sides 20 are connected and braced by transverse bars 35, 36 as shown in Figure 3. The rear bar 35 has near its center a forwardly projecting flange 37. Threaded through the bar 36 is a set screw 38 having swiveled on its rear end a guide bar 39 (Figures 3 and 3a).

Guide posts 40 extend from the guide bar 39 through suitable holes in the bar 36 (see Figures 2 and 3a), to keep the guide bar 39 in proper alignment.

The purpose of the flange 37 and bar 39 is to afford guide means and backing for the saw blade just below the edge of the saw for holding it firmly in place during the filing operation.

The flange 37 and bar 39 do not grip the saw blade, but permit it to slide, and they prevent it from moving sidewise of the saw during the filing operation.

Saw holding frame

I provide a saw holding frame, which will now be described.

The saw holding frame indicated generally at B in Figures 2 and 7, comprises a flat bottom strip 41 on which rests three spaced blade holders 42. Each blade holder 42 has generally in the form of an upwardly opening U-shaped member with its base 42a resting on the strip 41 and with its arms 42b extending upwardly and inclined toward each other. The arms 42b have vertically elongated slots 43.

Secured to the upper ends of the arms 42b are the blade holding strips 44.

The saw is slipped edge upward between the three sets of arms 42b.

Bolts 45 are extended through the slots 43 of the respective arms 42b and have wing nuts 46 by which they may be tightened.

After the saw is inserted between the pairs of arms with its cutting edge spaced slightly above the strips 44, the bolts 45 are adjusted to position under the back of the saw and the wing nuts are tightened, whereupon the strips 44 will tightly grip the saw blade and the bolts 45 will afford means for resisting downward movement of the saw.

The saw frame B may then be inserted into the openings 34 in the frame members 20 as shown in Figures 2 and 3.

The saw is indicated by the number 47 and its teeth are further indicated by the numeral 48.

The strip 41 is supported at the bottoms of the openings 34 and is wide enough to fit snugly but to slide freely in such openings.

File holding and operating means

I will now describe the file holding and operating means.

Connecting the arms 14 and 16 near the upper parts thereof are laterally spaced plates 50 of substantial vertical width. They have on their inner faces opposite pairs of cam grooves 51. These grooves may be formed in any suitable way as for example by milling out the inner faces of the plates 50 and then fastening in the recesses the cam plates 52.

The grooves 51 have the parallel upper and lower strips 51a and 51b and the substantially vertical front strips 51c and the converging rear strips 51d.

The plates 52 have slots 53 in which are pivoted the guide pawls 54, the free ends of which normally drop into the lower inclined cam groove strips 51d as shown in Figure 3.

The upper bar 55 slides between the plates 50 and has the anti-friction rollers 56 on opposite sides, projecting into the cam grooves 51.

A lower horizontal bar 57 also slides between the plates 50 and has on its rear end an operating handle 58.

Upright posts 59 extend through the bar 55 and are adjustably fastened therein by means of set screws 60. The posts 59 extend downwardly and are slidably projected through the bar 57.

These posts have collars 61 at their lower ends, and I preferably provide coil springs 62 between the collars 61 and the bar 57.

Extending downwardly from the posts 59 are gripping clamps 63 for holding the shanks 64 of ordinary drill chucks 65 for holding the ends of an ordinary three-corner file 66.

The bar 57 has fore-and-aft spaced downwardly extending flanges 67 and 68, which project laterally beyond the bar and slide on suitably mounted rods 69.

By grasping the handle 58 and swinging it back and forth, the file may be manipulated for filing the teeth of the saw as hereinafter more fully explained.

The flange 68 has a lug 70 to which a pitman 71 may be connected for power operation of the filing mechanism.

For sliding the saw and saw frame laterally automatically when the handle 58 is so manipulated, I provide the following means:

Saw advancing device

Projecting inwardly from the left-hand frame member 20 is a post 72 to which is pivoted an upwardly inclined link 73. Pivoted to the upper end of the link 73 is an internally threaded collar 74. A parallel link 75 is pivoted to the post 72 and also has at its upper end an internally threaded collar 76, aligned horizontally with the collar 74.

A threaded rod 77 is adjustably mounted in the collars 74 and 76 and has at its left-hand end the wing head 78 for convenient manipulation.

The link 75 projects downwardly below the post 72 and is normally yieldingly impelled at its lower end toward the left-hand frame member 20 by means of a coil spring 80. A link 81 is pivoted to the lower end of the link 75 and projects to the right in the machine, and is pivoted to an operating pawl 82.

Pivoted to the operating pawl 82 is another link 83, which slides telescopically in the sleeve 84. The sleeve 84 has an elongated slot 85 in one wall. A collar 86 slides on the sleeve 84. A screw 87 is mounted in the collar 86, so as to form a stop for the link 83.

Near its left-hand end, the sleeve 84 is pivoted as at 89 to the left-hand frame member 20. Projecting to the left from the frame member 20 is a plate 90 in which is a curved slot 91. A bolt 92 extends through the slot 91 and the left-hand end of the sleeve 84 and has a wing nut 93 thereon.

On top of the bar 55 is a cam plate 94 shown in Figures 2 and 2a, which cooperates with the threaded rod 77 to actuate the pawl 82 for moving the saw after each filing operation.

Before describing the modified form of the file operating mechanism of Figures 7, 8, 9 and 10, I shall explain the operation of the form of the device already described.

Let it be assumed that the saw has been clamped into the saw holding frame, and that the saw holding frame has been inserted into the holes 34 of the frame members 20, and that the guide bar 39 has been adjusted, so as to hold the saw against any substantial give during the filing operation, but yet to permit the saw to move lengthwise.

Let us assume further that the frame A has been locked by means of the locking finger 31 in position so that the saw will be exactly at right angles to the axis of the file 66.

Let it be further assumed that the file has been installed in the file operating mechanism and that the parts are in the position shown in Figure 3 ready for operation.

The saw will be at the left of its position shown in Figure 2, so that the teeth may be filed with a straight cross filing action, beginning at the end nearest to the handle of the saw.

The handle 58 of the saw operating mechanism is grasped and pushed rearwardly, which will be toward the left as shown in Figure 3.

It will be noted that the rollers 56 have started up in the lower inclined strips 51d of the cam grooves 51. Further movement of the handle 58 to the left carries the bars 57 and 55 to the left, causing the rollers 56 to travel rearwardly and to the converging ends of the inclined groove strips 51d, passing under and raising the pawls 54. At the extreme rear ends of the cam grooves, the rollers 56 clear the cams, whereupon the cams drop. The handle 58 is then pulled forwardly toward the operator and away from the machine, whereupon the rollers 56 will travel upwardly and forwardly on the pawls 54, and in the upper strips 51d of the cam grooves 51, thence further forwardly in the strips 51a until they reach the strips 51c when they will drop downwardly, causing the posts 59 to slide downwardly in the bar 57, carrying with them the file 66 until it drops to position for filing the first tooth.

Then on the rearward stroke of the handle 58, the file will operate on the first or right-hand tooth of the saw, viewing the parts as shown in Figure 2.

The cam plate 94 is so located on the bar 55 and the threaded rod 77 is so located, that during the forward stroke of the file operating mechanism, the inner end of the threaded rod 77 will be engaged by the cam face of the cam plate 94 and the threaded rod 77 will be pushed to the left from its position shown in Figure 2.

The degree of leftward movement of the threaded rod 77 depends upon the adjustment it has been given in the collars 74 and 76. It can be so adjusted that the saw sliding mechanism will be moved the distance of one tooth.

The leftward movement of the threaded screw 77 actuates the links 73 and 75 and the link 81 for swinging the pawl 82 from its position shown in Figure 2 to position where it engages a tooth of the saw 47 and positions the saw to the right the distance equivalent to one tooth.

All the operator has to do to continue the filing operation is to reciprocate the handle 58 forwardly as indicated by the upper arrow in Figure 3 and rearwardly as indicated by the lower arrow in Figure 3.

With each stroke, the saw will be advanced one-toothed distance to the right until the first filing operation is completed.

Then the teeth are set in the ordinary way and the filing operation can be completed.

After the teeth are set, the frame A is secured to one of the angular posts shown in Figure 1 in dotted lines.

For so adjusting the frame, the nut 29 shown in Figure 6 may be removed and the sleeve 30 lifted off the stud 27, and the frame swung to proper position, whereupon sleeve 30 may be replaced with its locking tongue 31 in the proper slots 32 and then the nut 29 may be replaced.

Thereupon the threaded rod 77 is adjusted in the collars 74 and 76 so that each operation of the cam plate 94 on the threaded rod 77 will advance the saw two teeth.

After each second tooth has been filed, the frame A can be adjusted to the second angular position shown in Figure 1 and the alternate teeth may be filed.

*Modified form of file operating mechanism*

In Figures 7, 8, 9, and 10 is shown a modified form of file operating mechanism.

The general frame of the device is the same as that already described, except as to the following particulars:

Instead of the bar 35, I use a somewhat wider bar 95, which has a short flange 96 inclined upwardly and forwardly as shown in Figure 7.

Instead of the bar 36, I provide extending upwardly from the member 21, an arm 97 to which is pivoted the lower end of an arm 98, having at its upper end an upwardly and rearwardly extending flange 99 arranged to coact with the flange 96 for preventing chattering of the saw blade and for holding it in place while still permitting it to slide lengthwise.

A set screw 100 is journaled in the arm 98 and screws into the arm 97 for permitting adjustment of the arm 98.

Referring now to the file operating mechanism proper, I provide a plate 101, having the upwardly projecting flanges 102, which project laterally beyond the plate 101, and are slidably mounted on the rods 103.

A pair of fore-and-aft spaced arms 104 are pivoted to the under side of the plate 101 to swing on horizontal transverse axes.

Secured to the lower end of each arm 104 at the sides thereof are the metal strips 105, which are spread at their lower ends as at 105a and are pivoted to a split ring 106, which is intended to grip the shank 64 of the chuck 65, such as has been already described.

The split ring 106 has the spaced projecting arms 107 which may be adjusted by means of a screw 108.

A pair of parallel operating bars 109 are pivoted to the arms 104, as shown in Figures 7 and 8, and have at their forward ends the operating handle 110.

On the left-hand bar 109 is the cam 111, which cooperates with the screw 77 in the same manner as does the cam plate 94 of the first-described file operating mechanism.

Hanging from the member 15 is an arm 112, which has at its lower end a flange 113 projecting toward the bars 109 and carrying an upstanding pin 114. A spring guide 115 extends downwardly from the plate 101 and has near its lower end a member 116, projecting toward the bars 109 and having a flat upper surface forming a shoulder.

Projecting downwardly from the member 116 is a double-faced cam 117 which is arranged to coact with the pin 114. A spring 118 is connected at one end to the plate 101 and at the other end to one of the arms 104, on one of the bars 109, to resist swinging movement of the bars 109 toward the plate 101.

It might be mentioned that the hinges 120 at the upper end of the arms 104 are so arranged as to permit the bars 109 to swing upwardly and rearwardly toward the plate 101 as illustrated by the dotted lines in Figure 7 but to prevent the swinging of the arms 104 past vertical in the other direction.

In practical operation of the form of the device now under consideration, the saw is mounted in its saw holding frame, which is then placed in the holes 34 of the frame A and the arm 98 is adjusted for bringing the flange 99 to proper position to serve as backing for the saw blade.

Assuming that the parts are in the position shown in Figure 7 in full lines, the operator grasps the handle 110 and shoves it rearwardly for moving the file across the saw and performing a filing operation.

The engagement of the file with the saw blade and the spring 118 prevents the bars 109 from swinging up toward the plate 101 during such filing stroke.

At the end of the filing stroke, however, the rearward flanges 102 strike the lugs 121, so that the plate 101 can travel no farther. Thereupon the arms 104 swing on their upper pivots and the bars 109 swing upwardly to their dotted line position shown in Figure 7.

The spring guide 115 is so arranged that the adjacent bar 109 strikes the extension 116 and shoves it aside during the upward swinging movement of the bars 109 (see Figure 8).

However, as soon as the bar 109 clears the extension 116, the resilience of the spring guide 115 swings the extension 116 underneath the bar 109. Then upon the return stroke of the device from rear to front, one of the bars 109 will rest on the extension 116 until during the return stroke, the cam 117 reaches the pin 114 and is sprung, so as to move the extension 116 out from under the bars 109.

The bars 109 then swing down to their full line position of Figure 7 for another sawing operation.

During this same return stroke, the cam 111 engages the screw 77 and causes the operation of the saw advancing pawl 82 heretofore described in connection with the explanation of the first form of my device.

The further operation of the mechanism now under consideration for completing the job of filing a saw will be obvious from the description already given in connection with the two forms of file handling mechanisms which have been explained.

It will, of course, be understood that the plate 101 may be connected with a pitman or other power operating mechanism.

It will be seen from the foregoing description that my apparatus is such that the saw filing operation may be done with a minimum of motion and effort, that the saw is advanced automatically as the filing mechanism is operated, and that the parts may be quickly and easily adjusted for filing any ordinary saw.

Some changes may be made in the details of the construction and arrangement of the parts of my improved saw filing machine, and it is my intention to cover by my claims any modified forms of structure or use of mechanical equivalents, which may be reasonably included within their scope.

I claim as my invention:

1. In a saw filing machine, a file operating mechanism comprising a pair of laterally spaced vertical plates 50, having cam grooves in their inner faces, the pivoted guide pawls 54 forming parts of the cam groove walls, a bar 55 arranged to slide between the plates 50 having rollers traveling in the grooves, a lower bar horizontally slidable, file holding means including uprights secured to the first bar, and vertically slidable in the lower bar, the grooves being shaped to cause the rollers to travel horizontally during the filing stroke and to cause the rollers to travel on a higher level during the return stroke.

2. In a saw filing machine, a file operating mechanism comprising a pair of laterally spaced vertical plates 50, having cam grooves in their inner faces, pivoted guide pawls 54 forming parts of the cam groove walls, a bar 55 arranged to slide between the plates 50 having rollers traveling in the grooves, a lower bar horizontally slidable, file holding means including uprights secured to the first bar, and vertically slidable in the lower bar, a saw holding means, and means actuated by the saw operating mechanism for intermittently advancing the saw in the saw holding means when the file operating means is actuated, the grooves being shaped to cause the rollers to travel horizontally during the filing stroke and to cause the rollers to travel on a higher level during the return stroke.

HERBERT E. HAMILTON.